United States Patent
Maru et al.

(10) Patent No.: US 7,208,883 B2
(45) Date of Patent: Apr. 24, 2007

(54) CURRENT DETECTION CIRCUIT, AND POWER SUPPLY APPARATUS, POWER SUPPLY SYSTEM AND ELECTRONIC APPARATUS USING THE CURRENT DETECTION CIRCUIT

(75) Inventors: Naoki Maru, Hadano (JP); Hideho Yamamura, Oiso (JP); Koji Nisisu, Hadano (JP); Shigeo Oomae, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/293,212

(22) Filed: Dec. 5, 2005

(65) Prior Publication Data

US 2006/0132062 A1    Jun. 22, 2006

(30) Foreign Application Priority Data

Dec. 8, 2004  (JP)  ............................ 2004-355343

(51) Int. Cl.
H05B 37/02    (2006.01)

(52) U.S. Cl. ............... 315/226; 315/224; 315/291; 315/209 R; 315/160; 363/56.03; 363/21.06; 363/15; 361/18; 361/63

(58) Field of Classification Search ................ 315/160, 315/163, 177, 205, 209 R, 216, 224, 226, 315/246, 254, 255, 291; 363/15, 17, 47, 363/98, 21.01, 21.06, 56.01–56.03; 361/18, 361/57, 30, 63, 84–87
See application file for complete search history.

(56) References Cited

U.S. PATENT DOCUMENTS

| | | | |
|---|---|---|---|
| 5,233,273 A * | 8/1993 | Waki et al. | 315/224 |
| 6,295,214 B1 * | 9/2001 | Matsumoto et al. | 363/21.01 |
| 6,625,043 B2 * | 9/2003 | Hatta et al. | 363/21.06 |
| 6,628,010 B2 * | 9/2003 | Yamamura et al. | 307/18 |
| 6,760,203 B2 * | 7/2004 | Usui | 361/18 |
| 6,894,882 B2 * | 5/2005 | Maru et al. | 361/91.1 |

FOREIGN PATENT DOCUMENTS

| | | |
|---|---|---|
| JP | 9-93929 | 4/1997 |
| JP | 2990742 | 10/1999 |
| JP | 2001-103741 | 4/2001 |

\* cited by examiner

*Primary Examiner*—Haissa Philogene
(74) *Attorney, Agent, or Firm*—Antonelli, Terry, Stout & Kraus, LLP.

(57) ABSTRACT

In the current detection circuit that detects the output currents of a switching power supply circuit, an improved current detection circuit makes it possible to detect the output current directions of power supplies solves the malfunction of the power supplies vibrating or diverging during changes in load state and during parallel operation, and thus implements stable operation. The direction of an output current I2 can be detected by using the current detection circuit 8 that has multiple switching elements S1 to S4 each operating synchronously with an inverter circuit.

12 Claims, 7 Drawing Sheets

CURRENT DETECTION CIRCUIT, AND POWER SUPPLY APPARATUS, POWER SUPPLY SYSTEM AND ELECTRONIC APPARATUS USING THE CURRENT DETECTION CIRCUIT

BACKGROUND OF THE INVENTION

The present invention relates to a current detection circuit, a power supply apparatus using the current detection circuit, a power supply system using the current detection circuit, and an electronic apparatus using the current detection circuit.

In recent years, switching power supplies are most commonly used as the power supplies for various electronic apparatuses. In general, switching power supplies contain a current detection circuit that converts the output currents of these switching power supplies into current detection voltages. These current detection voltages are used for an overcurrent protection circuit to protect the particular power supply from a load overcurrent, and for a parallel operation circuit to operate multiple such power supplies in parallel. The overcurrent protection circuit protects the appropriate power supply by conducting a power supply shutdown process and other processes if the occurrence of an overcurrent in the power supply due to an unusual event such as the abnormality of a load causes the current detection voltage to exceed a preset threshold voltage value. During parallel operation of multiple power supplies with their outputs connected in parallel to one another, the parallel operation circuit accurately recognizes the output currents of the power supplies, including the plus/minus direction of the particular current, and conducts control for an equal output current between the power supplies by, for example, adjusting the voltage settings of each power supply according to recognition results. The current detection voltage of the current detection circuit is needed to recognize the output currents of each power supply. Specific examples of the known methods employed for parallel operation circuits include the droop method, the average current method, the maximum current method, etc. (one such method is described in, for example, Japanese Patent Laid-Open No. Hei 9-93929).

A known circuit method of detecting the output currents of the power supplies required for a parallel operation circuit is by inserting a current detection shunt resistor in series between the output terminals of the power supplies and detecting the voltage developed across this resistor (refer to, for example, Japanese Patent No. 2990742). However, this method has the disadvantage that the shunt resistor generates a great deal of heat. Known method as one circuit method for solving this problem is by supplying to the shunt resistor a diode-rectified primary current of the transformer used for a switching power supply, and detecting the voltage developed across the resistor (refer to, for example, Japanese Patent Laid-Open No. 2001-103741). In this method, the primary current of the transformer is generally from as small as several fractions of a secondary current, to several tenths of fractions thereof. This makes it possible to reduce the value of the current flowing into the shunt resistor and hence to reduce any loss caused by the shunt resistor.

An example of a conventional switching power supply circuit composition which uses a current detection circuit is shown in FIG. 5. In the switching power supply circuit composition shown in FIG. 5, a DC power supply 51 is connected to an inverter circuit 52, the output of the inverter circuit 52 is connected to the primary winding 53a of a transformer 53, and the secondary winding 53b of the transformer 53 is connected to a rectifier circuit 54. Also, the output of the rectifier circuit 54 is connected to a smoothing circuit 55 and the output of the smoothing circuit 55 is connected to power supply outputs 55c, 55d. In addition, the primary winding 56a of a current transformer 56 is connected at a junction between the inverter circuit 52 and the primary winding 53a, the secondary winding 56b of the current transformer 56 is connected to a diode bridge 57, the output of the diode bridge 57 is connected to a resistor R51, both ends of the resistor R51 are connected to outputs 59a, 59b of a current detection circuit 58, and the outputs 59a, 59b of the current detection circuit 58 are connected to an overcurrent protection circuit 61. The overcurrent protection circuit 61 protects the appropriate power supply by conducting a power supply shutdown process and other processes if the occurrence of an overcurrent in the power supply due to an unusual event such as the abnormality of a load causes a current detection voltage V55 to exceed a preset threshold voltage value. A control circuit 62 controls the various internal components of the switching power supply circuit.

The inverter circuit 52 is of the full-bridge composition with four MOS-FETs, Q51 to Q54, and in this composition, a voltage V51 that has been input from the DC power supply 51 is switched by on/off operation of the MOS-FETs Q51 to Q54 to thereby generate an AC voltage, and AC voltage V52 is input to the primary winding 53a of the transformer 53. A capacitor 52a is a bypass capacitor. The transformer 53 steps down the input AC voltage according to the particular turns ratio of the transformer 53, and then outputs the stepped-down AC voltage to the secondary winding 53b of the transformer 53. The rectifier circuit 54 rectifies the stepped-down AC voltage output of the secondary winding 53b synchronously with MOS-FET Q55/Q56 switching, thus generating a unidirectional pulse voltage. After the pulse voltage has been rectified by the rectifying circuit 54, the smoothing circuit 55 converts the rectified pulse voltage into a DC voltage by smoothing with a low-pass filter composed of a coil 55a and a capacitor 55b, and outputs the DC voltage to the power supply outputs 55c, 55d.

FIG. 8 shows a timing chart of the major circuit operation waveforms developed when power supply output current I52 of the switching power supply circuit composition in FIG. 5 flows in a plus direction. The circuits operate with a duration from t1 to t5 as one period. The MOS-FET Q51 to Q54 of the inverter circuit 52 are controlled in terms of phase shift. During the phase shift control, the Q51 to the Q54 are each driven at a turn-on time duty ratio of 0.5, turn-on of the Q51 alternates with that of the Q52, and turn-on of the Q53 alternates with that of the Q54. The turn-on timing of the Q53 and the turn-off timing of the Q54 are delayed by a fixed time (a time period from t1 to t2) behind the turn-on timing of the Q51 and the turn-off timing of the Q52, respectively, and the turn-off timing of the Q53 and the turn-on timing of the Q54 are delayed by a fixed time (a time period from t3 to t4) behind the turn-off timing of the Q51 and the turn-on timing of the Q52, respectively. Also, the MOS-FET Q55 of the rectifier circuit 54 operates synchronously with the turn-on/turn-off timing of the Q51, and the MOS-FET Q56 of the rectifier circuit 54 operates synchronously with the turn-on/turn-off timing of the Q52.

During the time period from t1 to t2, since the Q51 and the Q54 are turned on and the Q52 and the Q53 are turned off, the voltage V52 on the primary winding 53a of the transformer 53 becomes a plus voltage. Also, since the Q55 is turned on and the Q56 is turned off, the current to the transformer secondary winding 53b flows from the power supply output 55d to the secondary winding 53b, the MOS-FET Q55, the coil 55a, and the power supply output 55c, in that order, and current I51 to the primary winding 53a of the transformer 53 flows in a plus direction.

During the time period from t2 to t3, since the Q51 and the Q53 are turned on and the Q52 and the Q54 are turned off, both ends of the primary winding 53a are shunted by the inverter circuit 52 and thus the primary winding voltage V52 of the transformer 53 becomes zero. Also, since the Q55 is turned on and the Q56 is turned off, the current to the transformer secondary winding 53b flows from the power supply output 55d to the secondary winding 53b, the MOS-FET Q55, the coil 55a, and the power supply output 55c, in that order, and the current I51 to the primary winding 53a of the transformer 53 flows in a plus direction.

During a period from t3 to t4, since the Q52 and the Q53 are turned on and the Q51 and the Q54 are turned off, the voltage V52 on the primary winding 53a of the transformer 53 becomes a minus voltage. Also, since the Q56 is turned on and the Q55 is turned off, the current to the transformer secondary winding 53b flows from the power supply output 55d to the secondary winding 53b, the MOS-FET Q56, the coil 55a, and the power supply output 55c, in that order, and current I51 to the primary winding 53a of the transformer 53 flows in a minus direction.

During a period from t4 to t5, since the Q52 and the Q54 are turned on and the Q51 and the Q53 are turned off, both ends of the primary winding 53a are shunted by the inverter circuit 52 and thus the primary winding voltage V52 of the transformer 53 becomes zero. Also, since the Q56 is turned on and the Q55 is turned off, the current to the transformer secondary winding 53b flows from the power supply output 55d to the secondary winding 53b, the MOS-FET Q56, the coil 55a, and the power supply output 55c, in that order, and the current I51 to the primary winding 53a of the transformer 53 flows in a minus direction.

Controlling the amounts of phase shift that are equivalent to the time periods from t1 to t2 and from t3 to t4 makes it possible to control the pulse width of the voltage V52 on the primary winding 53a of the transformer 53. In addition, stepping down the voltage V52 at the turns ratio of the transformer 53, then activating the rectifier circuit 54 to rectify the stepped-down voltage, and smoothing the rectified voltage into DC voltage form with the smoothing circuit 55 makes it possible to control a power supply output voltage V53 by controlling the amounts of phase shift.

An amplitude of the current I51 is determined by the power supply output current I52 and the turns ratio of the transformer 53. For example, if the power supply output current I52 is 300 A and the transformer 53 has 30 T (turns) on the primary winding 53a and 1 T (turn) on the secondary winding 53b, the amplitude of the current I51 is expressed as 300 A/(30 T/1 T)=10 A. Thus, it can be seen that the amplitude of the current I51 is proportional to the power supply output current I52 and that an associated coefficient of proportionality is determined by the turns ratio of the transformer 53. In addition, since the primary winding 53a of the transformer 53 is shunted by the inverter circuit 52 during the periods from t2 to t3 and from t4 to t5, the current I51 of the primary winding 53a does not become zero and the current determined by the power supply output current I52 and the turns ratio of the transformer 53 continues to flow. Hence, even when the above amounts of phase shift change and the power supply output voltage V53 changes, if the power supply output current I52 is constant, a waveform of the current I51 is constant.

Transforming the current I51 with a current transformer 56, then rectifying this current into a direct current I54 using a diode bridge 57, and conducting this direct current into the resistor R51 makes it possible to obtain a current detection voltage V55 proportional to the power supply output current I52. Suppose, for example, that the power supply output current I52 is 300 A, that the transformer 53 has 30 T (turns) on the primary winding 53a and 1 T (turn) on the secondary winding 53b, that the current transformer 56 has 1 T (turn) on its primary winding 56a and 100 T (turns) on its secondary winding 56b, and that the resistor R51 has a value of 10 Ů. In this case, a current detection voltage V55 of 300 A/(30 T/1 T)/(100 T/1 T)×10 Ů=1 V can be obtained and a current detection sensitivity of the current detection circuit becomes 1 V/300 A.

SUMMARY OF THE INVENTION

In general, power supplies having a synchronous rectifier circuit can draw electric current in both directions between drain and source terminals when the MOS-FETs used in the synchronous rectifier circuit are activated. If the voltage setting of the power supply decreases below the voltage of the load connected to the power supply, therefore, the output current of the power supply may flow in a minus direction. When the state of the load changes, in particular, the current may become minus to recharge or discharge the capacitor (e.g., 55b in FIG. 5) connected inside or outside the power supply. In addition, for parallel operation of multiple power supplies with the respective outputs connected in parallel, variations in the voltage settings of the power supplies may cause the output current of the power supply lower in the voltage setting to become minus. Therefore, a control circuit for operating the power supplies in parallel needs to accurately recognize the output currents of each power supply, including the plus or minus direction of the particular current, and to perform control functions such as adjusting the voltage settings of each power supply according to recognition results. For this reason, the current detection circuit is required to be able to detect the direction of the power supply current correctly. However, for a power supply with a current detection circuit of the method employing diodes to rectify the primary current of a transformer as in the conventional switching power supply circuit shown in FIG. 5, when the power supply output current I52 becomes a minus current, the current to the transformer 53 and the current to the current transformer 56 flow in inverse directions to each other. Therefore, although the current I53 to the secondary winding 56b of the current transformer 56 flows in a minus direction, current I54 to the resistor R51 continues to flow in a plus direction since the current I53 is rectified by the diode bridge 57. A graph representing the relationship between the power supply output current I52 and the current detection voltage V55 is shown in FIG. 10. It can be seen from this figure that the current detection circuit in the switching power supply circuit of FIG. 5 can detect only the absolute value of the power supply output currents. When the load state changes or when parallel operation is started, the power supplies may vibrate, diverge, or malfunction. For example, if the output currents of two power supplies operated in parallel are +100 A and −100 A, the current detection circuits of the two power supplies report the output currents as +100 A and −100 A of the respective absolute values, and erroneously recognize that the parallel operation circuit is equaled in load current. The erroneous recognition not only occurs for the above case of +100 A and −100 A, but also applies to those current values of, for example, +50 A and −50 A or +200 A and −200 A, that take the same absolute value. As a result, in all these cases, a stabilizing point of operation does not exist.

Another circuit method usable to detect the directions of the power supply output currents is by adding a shunt resistor in series to a power supply output terminal and then detecting the voltage developed across the shunt resistor. In actual operation, however, this method may not be usable since the shunt resistor generates a great deal of heat.

For these reasons, in the conventional techniques, all current detection voltages of the current detection circuit are oriented in a plus direction, respective of whether the power supply output current flows in a plus or minus direction, and thus the power supply output current direction cannot be correctly detected.

The present invention solves the above problem by using, in a switching power supply circuit, a current detection circuit that has multiple switching elements.

Advantageous effects of the present invention are that it makes possible to detect an output current direction of a power supply in a current detection circuit which detects the output current of the power supply, and implement stable operation by solving power supply malfunction such as vibration or divergence due to load state changes or during parallel operation.

DESCRIPTION OF PREFERRED EMBODIMENTS

Embodiments of the present invention will be described in detail with reference to the accompanying drawings.

Figure 1:
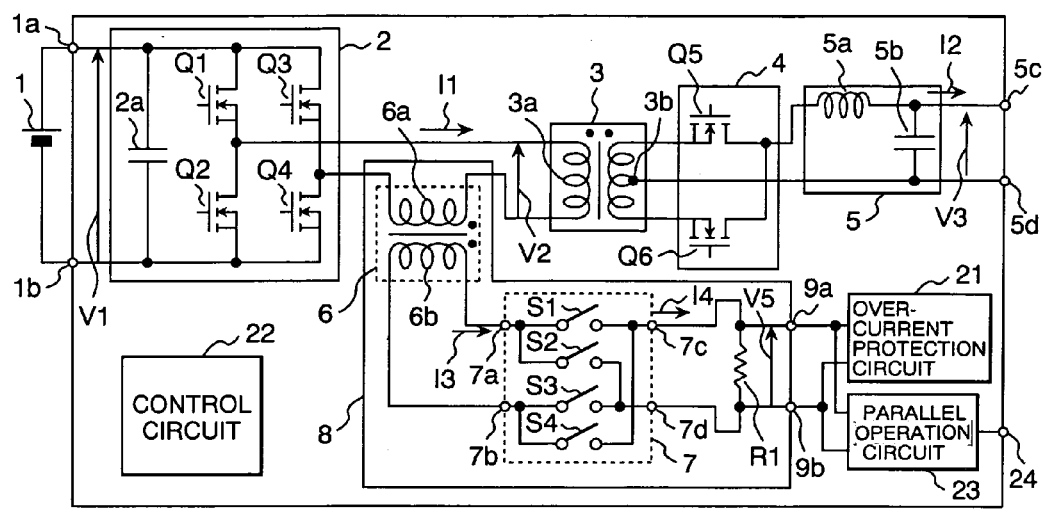
FIG. 1 is a block diagram of a switching power supply circuit of a first embodiment.

FIG. 1 is a block diagram showing a switching power supply circuit of a first embodiment of the present invention.

In the switching power supply circuit of FIG. 1, a DC power supply 1 is connected to an inverter circuit 2, an output of the inverter circuit 2 is connected to a primary winding 3a of a transformer 3, and a secondary winding 3b of the transformer 3 is connected to a rectifier circuit 4. Also, an output of the rectifier circuit 4 is connected to a smoothing circuit 5, and an output of the smoothing circuit is connected to power supply outputs 5c, 5d. Also, a primary winding 6a of a current transformer 6 is connected at a junction between the inverter circuit 2 and the primary winding 3a, a secondary winding 6b of the current transformer 6 is connected to a switching circuit 7, an output of the switching circuit 7 is connected to a resistor R1, both ends of the resistor R1 are connected to outputs 9a, 9b of a current detection circuit 8, and outputs 9a, 9b of the current detection circuit 8 are connected to an overcurrent protection circuit 21 and a parallel operation circuit 23. The overcurrent protection circuit 21 protects an associated power supply by conducting a power supply shutdown process and other processes if the occurrence of an overcurrent in the power supply due to an unusual event such as abnormality of a load causes a current detection voltage V5 to exceed a preset threshold voltage value. During parallel running of multiple power supplies with their outputs connected in parallel to one another, the parallel operation circuit 23 accurately recognizes output currents of the power supplies, inclusive of a plus/minus current direction, and conducts control for an equal output current between the power supplies by, for example, adjusting respective voltage settings of the power supplies according to recognition results. A parallel operation signal 24 is output from the parallel operation circuit 23, and then this signal is coupled between the power supplies to be run in parallel, whereby information on the output currents of each power supply can be shared. A control circuit 22 controls various internal components of the switching power supply circuit.

The inverter circuit 2 is of a full-bridge composition with four MOS-FETs, Q1 to Q4, and in this composition, a voltage V1 that has been input from the DC power supply 1 is switched by on/off operation of the MOS-FETs Q1 to Q4 to thereby generate an AC voltage, and AC voltage V2 is input to the primary winding 3a of the transformer 3. A capacitor 2a is a bypass capacitor. The transformer 3 steps down the input AC voltage according to a particular turns ratio of the transformer 3, and then outputs the stepped-down AC voltage to the secondary winding 3b of the transformer 3. The rectifier circuit 4 rectifies the stepped-down AC voltage output of the secondary winding 3b synchronously with MOS-FET Q5/Q6 switching, thus generating a unidirectional pulse voltage. After the pulse voltage has been rectified by the rectifying circuit 4, the smoothing circuit 5 converts the rectified pulse voltage into a DC voltage by smoothing with a low-pass filter composed of a coil 5a and a capacitor 5b, and outputs the DC voltage to the power supply outputs 5c, 5d.

Figure 6:
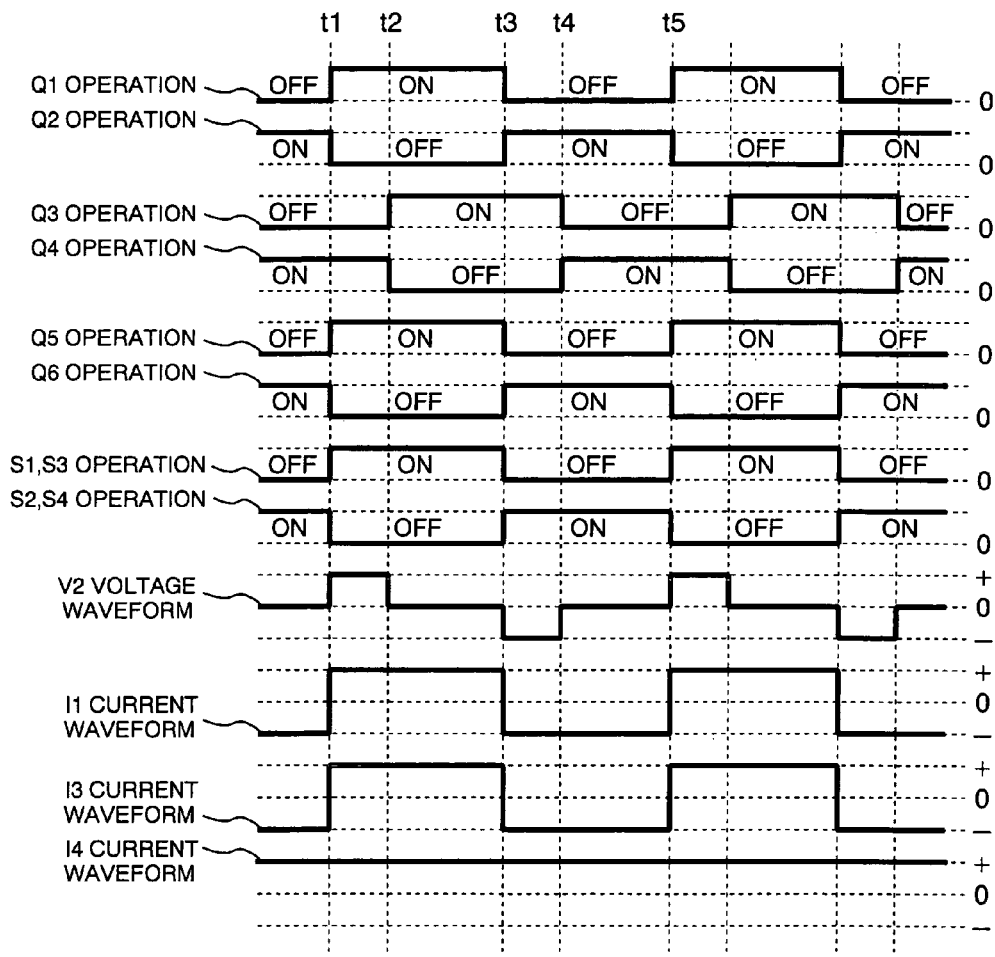
FIG. 6 is a timing chart of the circuit operation waveforms developed in the embodiment of FIG. 1 when a power supply output current direction is plus.

FIG. 6 shows a timing chart of the major circuit operation waveforms developed when a power supply output current I2 flows in a plus direction in the switching power supply circuit of FIG. 1. Circuits operate with a duration from t1 to t5 as one period. The MOS-FET Q1 to Q4 of the inverter circuit 2 are controlled in terms of phase shift. During the phase shift control, the Q1 to the Q4 are each driven at a turn-on time duty ratio of 0.5, turn-on of the Q1 alternates with that of the Q2, and turn-on of the Q3 alternates with that of the Q4. Turn-on timing of the Q3 and turn-off timing of the Q4 are delayed by a fixed time (a time period from t1 to t2) behind turn-on timing of the Q1 and turn-off timing of the Q2, respectively, and turn-off timing of the Q3 and the turn-on timing of the Q4 are delayed by a fixed time (a time period from t3 to t4) behind the turn-off timing of the Q1 and the turn-on timing of the Q2, respectively. Also, the MOS-FET Q5 of the rectifier circuit 4 operates synchronously with the turn-on/turn-off timing of the Q1, and the MOS-FET Q6 of the rectifier circuit 4 operates synchronously with the turn-on/turn-off timing of the Q2.

During the time period from t1 to t2, since the Q1 and the Q4 are turned on and the Q2 and the Q3 are turned off, the voltage V2 on the primary winding 3a of the transformer 3 becomes a plus voltage. Also, since the Q5 is turned on and the Q6 is turned off, a current to the transformer secondary winding 3b flows from the power supply output 5d to the secondary winding 3b, the MOS-FET Q5, the coil 5a, and the power supply output 5c, in that order, and current I1 to the primary winding 3a of the transformer 3 flows in a plus direction.

During the time period from t2 to t3, since the Q1 and the Q3 are turned on and the Q2 and the Q4 are turned off, both ends of the primary winding 3a are shunted by the inverter circuit 2 and thus the primary winding voltage V2 of the transformer 3 becomes zero. Also, since the Q5 is turned on and the Q6 is turned off, the current to the transformer secondary winding 3b flows from the power supply output 5d to the secondary winding 3b, the MOS-FET Q5, the coil 5a, and the power supply output 5c, in that order, and the current I1 to the primary winding 3a of the transformer 3 flows in a plus direction.

During a period from t3 to t4, since the Q2 and the Q3 are turned on and the Q1 and the Q4 are turned off, the voltage V2 on the primary winding 3a of the transformer 3 becomes a minus voltage. Also, since the Q6 is turned on and the Q5 is turned off, the current to the transformer secondary winding 3b flows from the power supply output 5d to the secondary winding 3b, the MOS-FET Q6, the coil 5a, and the power supply output 5c, in that order, and the current I1 to the primary winding 3a of the transformer 3 flows in a minus direction.

During a time period from t4 to t5, since the Q2 and the Q4 are turned on and the Q1 and the Q3 are turned off, both ends of the primary winding 3a are shunted by the inverter circuit 2 and thus the primary winding voltage V2 of the transformer 3 becomes zero. Also, since the Q6 is turned on and the Q5 is turned off, the current to the transformer secondary winding 3b flows from the power supply output 5d to the secondary winding 3b, the MOS-FET Q6, the coil 5a, and the power supply output 5c, in that order, and the current I1 to the primary winding 3a of the transformer 3 flows in a minus direction.

Controlling the amounts of phase shift that are equivalent to the time periods from t1 to t2 and from t3 to t4 makes it possible to control a pulse width of the voltage V2 on the primary winding 3a of the transformer 3. In addition, stepping down the voltage V2 at the turns ratio of the transformer 3, then activating the rectifier circuit 4 to rectify the stepped-down voltage, and smoothing the rectified voltage into DC voltage form with the smoothing circuit 5 makes it possible to control a power supply output voltage V3 by controlling the amounts of phase shift.

An amplitude of the current I1 is determined by the power supply output current I2 and the turns ratio of the transformer 3. For example, if the power supply output current I2 is 300 A and the transformer 3 has 30 T (turns) on the primary winding 3a and 1 T (turn) on the secondary winding 3b, the amplitude of the current I1 is expressed as 300 A/(30 T/1 T)=10 A. Thus, it can be seen that the amplitude of the current I1 is proportional to the power supply output current I2 and that an associated coefficient of proportionality is determined by the turns ratio of the transformer 3. In addition, since the primary winding 3a of the transformer 3 is shunted by the inverter circuit 2 during the periods from t2 to t3 and from t4 to t5, the current I1 of the primary winding 3a does not become zero and the current determined by the power supply output current I2 and the turns ratio of the transformer 3 continues to flow. Hence, even when the above amounts of phase shift change and the power supply output voltage V3 changes, if the power supply output current I2 is constant, a waveform of the current I1 is constant.

The current transformer 6 transforms the current I1 of the primary winding 6a and after converting this current according to a turns ratio of the current transformer 6, conducts the resulting current as a current I3 into the secondary winding 6b. Suppose, for example, that the amplitude of the current I1 of the primary winding 6a is 10 A and that the current transformer 6 has 1 T (turns) on the primary winding 6a and 100 T (turns) on the secondary winding 6b. In this case, the amplitude of the current I3 of the primary winding 6a is 10 A/(100 T/1 T)=0.1 A. Accordingly, the currents I1 and I3 take analogous current waveforms different in amplitude or take current waveforms analogous with respect to voltage.

The switching circuit 7 includes four switching elements, S1 to S4, and synchronously rectifies the current I3. For example, MOS-FETs, bipolar transistors, IC-formed semiconductor switches, or the like can be used as the switching elements. The switching elements S1, S3 operate synchronously with the on/off timing of the MOS-FET Q5, and the switching elements S2, S4 operate synchronously with the on/off timing of the MOS-FET Q6.

Next, the current flowing into the switching elements S1 to S4 is described below.

During a period from t1 to t3, since the switching elements S1 and S3 are turned on and the switching elements S2 and S4 are turned off and since the current I3 flows in a plus direction, the current to the secondary winding of the current transformer 6 flows from secondary winding 6b, terminal 7a, switching element S1, terminal 7c, resistor R1, terminal 7d, switching element S3, and terminal 7b, in that order. At this time, no current flows into the switching elements S2 and S4 since these elements are both off.

During a period from t3 to t5, since the switching elements S2 and S4 are turned on and the switching elements S1 and S3 are turned off and since the current I3 flows in a minus direction, the current to the secondary winding of the current transformer 6 flows from secondary winding 6b, terminal 7b, switching element S4, terminal 7c, resistor R1, terminal 7d, switching element S2, and terminal 7a, in that order. At this time, no current flows into the switching elements S1 and S3 since these elements are both off.

Hence, a current I4 across the resistor R1 is always a DC current flowing from the terminal 7c of the switching circuit 7 to the terminal 7d during the t1–t5 period, and the current detection voltage V5 of the current detection circuit 8 becomes a DC voltage of a plus direction.

Figure 7:
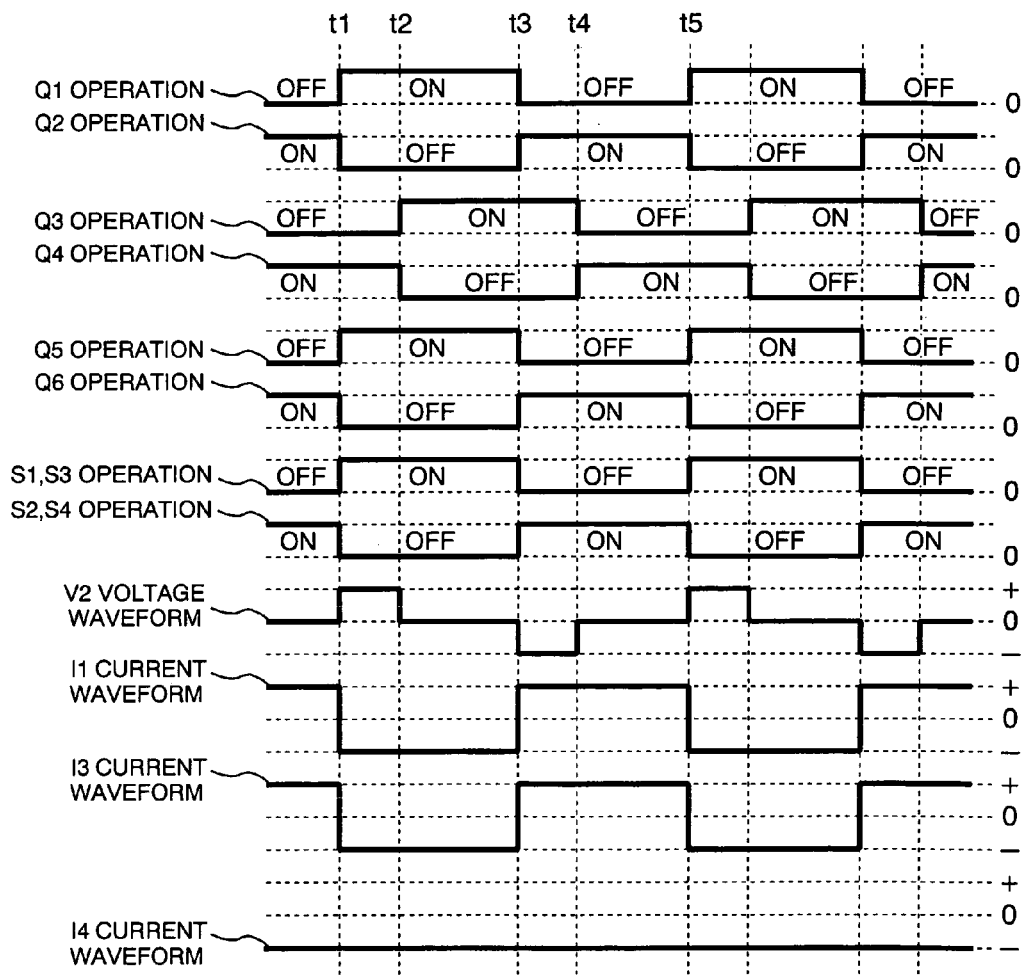
FIG. 7 is a timing chart of the circuit operation waveforms developed in the embodiment of FIG. 1 when the power supply output current direction is minus.
Figure 8:
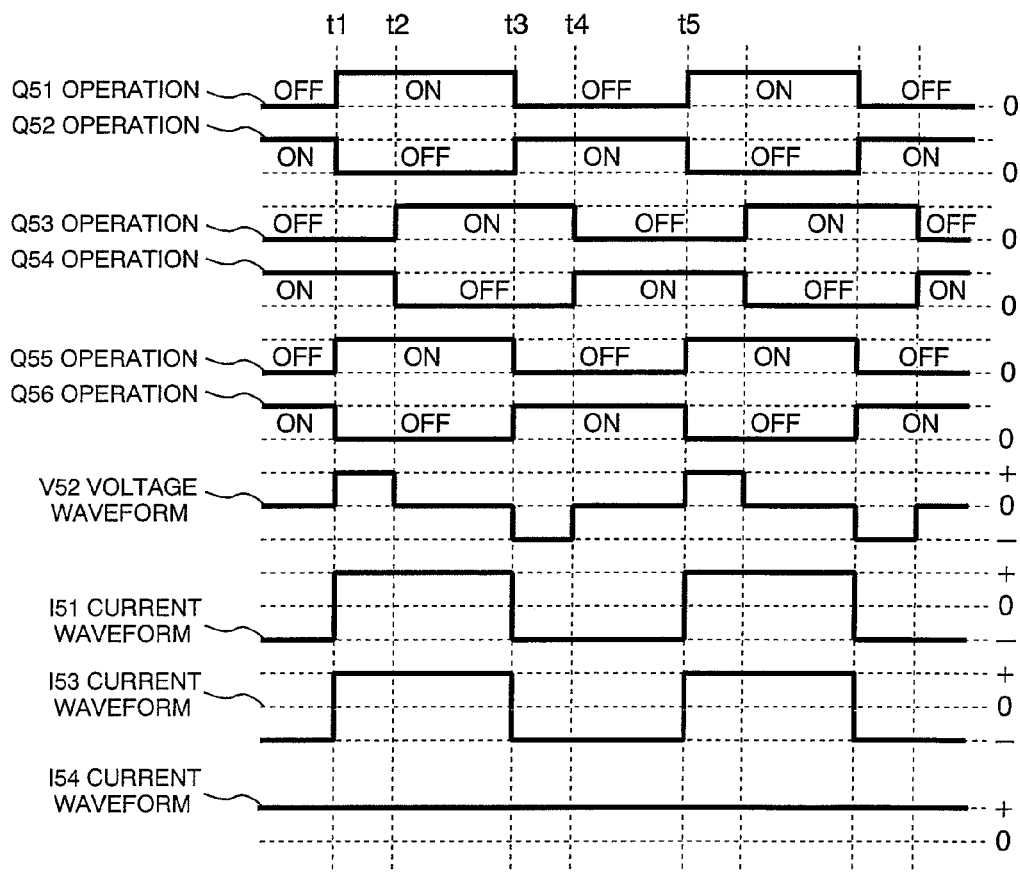
FIG. 8 is a timing chart of circuit operation waveforms in an example of the conventional technique.

FIG. 7 shows a timing chart of the major circuit operation waveforms developed when the power supply output current I2 flows in a minus direction in the switching power supply circuit of FIG. 1. The operation timing of the MOS-FETs Q1 to Q6 and the switching elements S1 to S4, shown in FIG. 7, is the same as in the timing chart of FIG. 6 applied when the power supply output current I2 flows in a plus direction. Also, the waveform of the voltage V2, shown in FIG. 7, is the same as the associated waveform shown in FIG. 6. This is because FIGS. 6 and 7 are the same in terms of the timing of the MOS-FETs Q1 to Q4 that determines the voltage V2. Since the power supply output current I2 flows in a minus direction, the currents into the transformer 3 and into the current transformer 6 are of opposite polarity to the associated currents shown in FIG. 6. More specifically, during the t1–t3 period, the currents I1 and I3 flow in a minus direction, and during the t3–t5 period, the currents I1 and I3 flow in a plus direction. Next, the current flowing into the switching elements S1 to S4 of FIG. 7 is described below.

During the t1–t3 period, since the switching elements S1 and S3 are turned on and the switching elements S2 and S4 are turned off and since the current I3 flows in a minus direction, the current to the secondary winding of the current transformer 6 flows from the secondary winding 6b, the terminal 7b, the switching element S3, the terminal 7d, the resistor R1, the terminal 7c, the switching element S1, and the terminal 7a, in that order. At this time, no current flows into the switching elements S2 and S4 since these elements are both off.

During the t3–t5 period, since the switching elements S2 and S4 are turned on and the switching elements S1 and S3 are turned off and since the current I3 flows in a plus direction, the current to the secondary winding of the current transformer 6 flows from the secondary winding 6b, the terminal 7a, the switching element S2, the terminal 7d, the resistor R1, the terminal 7c, the switching element S4, and the terminal 7b, in that order. At this time, no current flows into the switching elements S1 and S3 since these elements are both off.

Hence, the current I4 across the resistor R1 is always a DC current flowing from the terminal 7d of the switching circuit 7 to the terminal 7c during the t1–t5 period, and the current detection voltage V5 of the current detection circuit 8 becomes a DC voltage of a minus direction.

In this way, if the power supply output current I2 flows in a plus direction, V5 is a DC voltage of a plus direction, and if the current I2 flows in a minus direction, V5 is a DC voltage of a minus direction.

In addition, since the current I1 is determined by the power supply output current I2 and the turns ratio of the transformer 3, since the current I3 is determined by the current I1 and the turns ratio of the current transformer 6, and since the current I4 is a current obtained synchronously rectifying the current I3 in the switching circuit 7, it can be seen that an absolute value of the current I3 and that of the current I4 are the same. Since the current detection voltage V5 is a product of a value of the resistor R1 and the current I4, it can be seen that the current detection voltage V5 is proportional to the power supply output current I2. Suppose, for example, that the power supply output current I2 is 300 A, that the transformer 3 has 30 T (turns) on the primary winding 3a and 1 T (turn) on the secondary winding 3b, that the current transformer 6 has 1 T (turn) on its primary winding 6a and 100 T (turns) on its secondary winding 6b, and that the resistor R1 has a value of 10 Ù. In this case, a current detection voltage V5 of 300 A/(30 T/1 T)/(100 T/1 T)×10 Ù=1 V can be obtained and a current detection sensitivity of the current detection circuit becomes 1 V/300 A.

Figure 9:
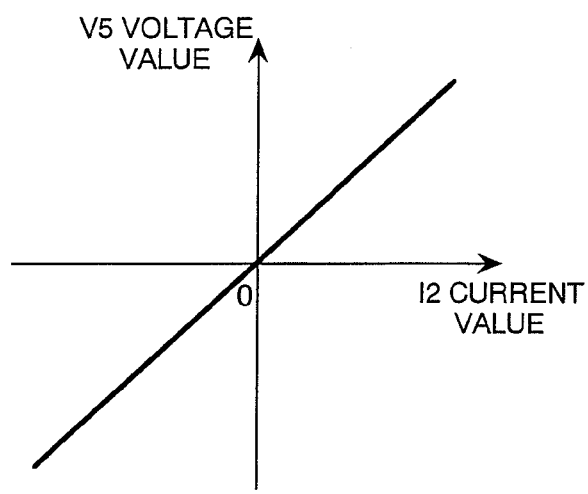
FIG. 9 is a graph representing the relationship between an output current and current detection voltage in the embodiment of FIG. 1.
Figure 10:
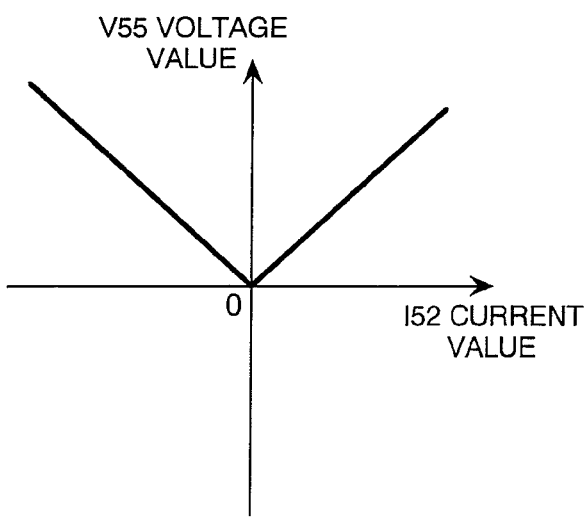
FIG. 10 is a graph representing the relationship between an output current and current detection voltage in the example of the conventional technique.

As described above, operating the switching elements S to S4 synchronously with the switching operation of the power supplies enables the current detection circuit 8 of the switching power supply circuit in FIG. 1 to detect the direction of flow of the power supply output current I2 by polarity of the current detection voltage V5. Additionally, magnitude of the current detection voltage V5 is proportional to that of the output current. A graph representing a relationship between the power supply output current I2 and the current detection voltage V5 is shown in FIG. 9. For these reasons, the switching power supply circuit can detect the direction and magnitude of the power supply output current I2, and even when the load changes in state or when multiple power supplies are run in parallel, it is possible to implement stable operation free of vibration and divergence.

Even if the resistor R1 in the switching power supply in FIG. 1 is moved from an original position and connected between the terminals 7a and 7b of the switching circuit 7, substantially the same current detection voltage as that of FIG. 1 can be obtained since the switching circuit 7 rectifies the AC voltage developed by the resulting flow of the current I3 from the primary winding 6b of the current transformer 6 into the resistor R1. Also, even if the number of switching elements used in the switching circuit 7 is other than four, it is possible to realize similar current detection. For example, the switching circuit can use two (first and second) switching elements and be such that the first switching element is connected to one end of the primary winding 6b of the current transformer 6, that the second switching element is connected to the other end of the primary winding 6b, that the first and second switching elements are connected at respective output terminals, and that an output of current detection is generated between the output terminal of the first switching element and an intermediate tap of the secondary winding 6b. In addition, similar operation can be achieved by capacitor coupling or direct coupling, instead of disposing the current transformer 6.

Figure 2:
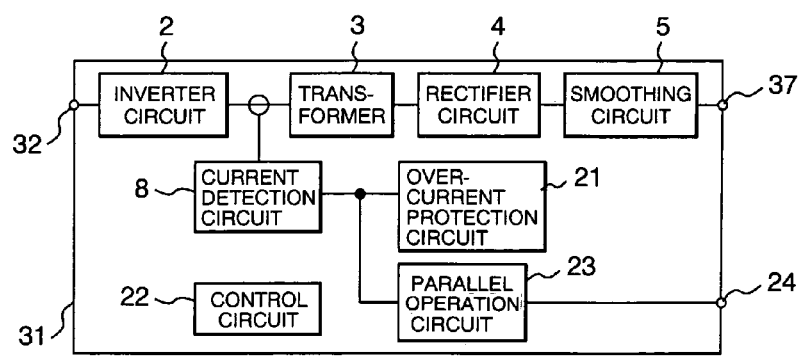
FIG. 2 is a configuration diagram of a power supply apparatus of a second embodiment.

FIG. 2 is a configuration diagram of a power supply apparatus of a second embodiment of the present invention.

In FIG. 2, reference number 31 denotes the power supply apparatus and 32 denotes a power supply input. The power supply apparatus 31 includes the inverter circuit 2, transformer 3, rectifier circuit 4, and smoothing circuit 5 shown in FIG. 1. Reference number 37 denotes a power supply output. The power supply apparatus 31 also includes a current detection circuit 8, an overcurrent protection circuit 21, and a parallel operation circuit 23, and outputs a parallel operation signal 24.

As shown in FIG. 2, in the power supply apparatus 31 of the present embodiment, the inverter circuit 2 is connected to the power supply input 32, the transformer 3 is connected to the inverter circuit 2, the rectifier circuit 4 is connected to the transformer 3, the smoothing circuit 5 is connected to the rectifier circuit 4, and the power supply output 37 is connected to the smoothing circuit 5. Also, in the power supply apparatus 31, the current detection circuit 8 is connected between the inverter circuit 2 and the transformer 3, and the overcurrent protection circuit 21 and the parallel operation circuit 23 are connected to the current detection circuit 8. The parallel operation signal 24 is output from the parallel operation circuit 23. Furthermore, the power supply apparatus 31 internally has a control circuit 22.

As described above, since the power supply apparatus 31 uses the same current detection circuit 8 and parallel operation circuit 23 as those of the first embodiment, directions and magnitudes of power supply output currents can be detected similarly to the first embodiment. Additionally, even when a load changes in state or when multiple power supplies are run in parallel, it is possible to implement stable operation free of vibration and divergence.

Stable apparatus operation under a change in load state can be achieved, even if the parallel operation circuit 23 is removed from the power supply apparatus 31 or even if the parallel operation circuit 23 is not operated.

Figure 3:
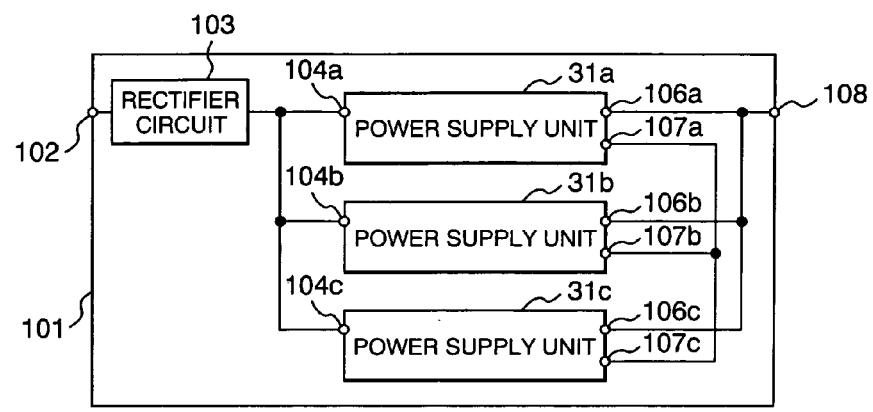
FIG. 3 is a configuration diagram of a power supply system of a third embodiment.

FIG. 3 is a configuration diagram of a power supply system of a third embodiment of the present invention.

In FIG. 3, reference number 101 denotes the power supply system, 102 a power supply input, and 103 a rectifier circuit. Reference numbers 104a, 104b, 104c denote power supply inputs, 31a, 31b, 31c denote the same power supply units as the apparatus 31 in FIG. 2. Reference numbers 106a, 106b, 106c denote power supply outputs, 107a, 107b, 107c denote parallel operation signals, and 108 denotes a power supply output.

As shown in FIG. 3, in the power supply system 101 of the present embodiment, the rectifier circuit 103 is connected to the power supply input 102, the power supply units 31a, 31b, 31c are connected in parallel to the rectifier circuit 103, the power supply output 108 of the power supply system 101 is connected to parallel-connected power supply outputs 106a, 106b, 106c of the power supply units 31a, 31b, 31c, and the parallel operation signals 107a, 107b, 107c of the power supply units 31a, 31b, 31c are coupled in parallel to one another.

The rectifier circuit 103 is a circuit that rectifies an AC voltage that has been input to the power supply input 102, and converts the rectified voltage into DC form. This circuit can be realized by, for example, applying a rectifier circuit that uses a diode bridge, a PFC (Power Factor Correction) circuit, or the like.

As described above, since the power supply system 101 uses the same power supply unit as the power supply apparatus 31 described in the second embodiment, directions and magnitudes of power supply output currents can be detected similarly to the second embodiment. Additionally, even when a load changes in state or when multiple power supplies are run in parallel, it is possible to implement stable operation free of vibration and divergence.

Figure 4:
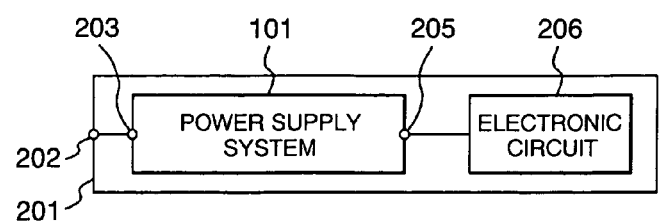
FIG. 4 is a configuration diagram of an electronic apparatus of a fourth embodiment.
Figure 5:
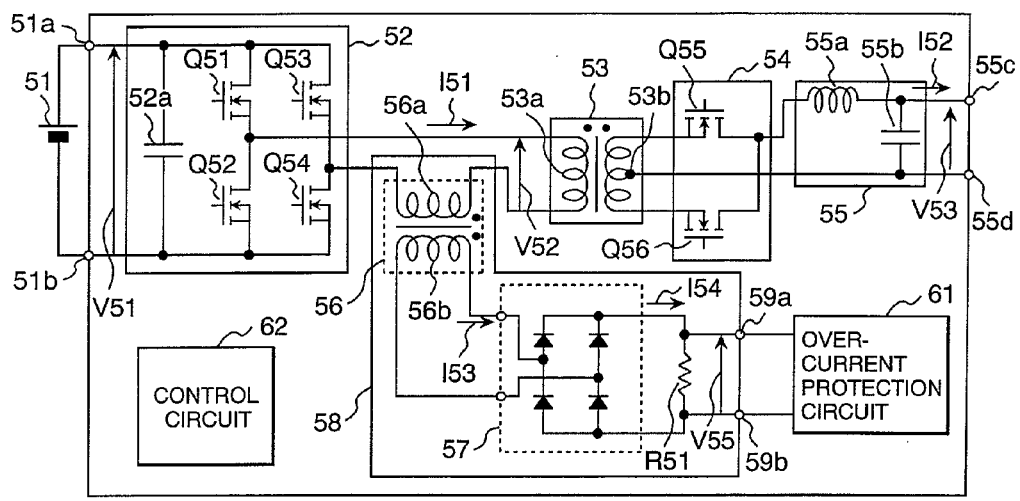
FIG. 5 is a block diagram of a switching power supply circuit based on a conventional technique.

FIG. 4 is a configuration diagram of an electronic apparatus of a fourth embodiment of the present invention.

In FIG. 4, reference number 201 denotes the electronic apparatus, 202 a power supply input, 203 another power supply input, 101 the same power supply system as the system 101 of FIG. 3, 205 a power supply output, and 206 an electronic circuit. As shown in FIG. 4, in the electronic apparatus 201 of the present embodiment, the power supply system 101 is connected to the power supply input 202 and the electronic circuit 206 is connected to the power supply system 101.

Examples of the electronic circuit 206 include necessary electronic circuits such as an electronic arithmetic circuit, memory circuit, amplifier circuit, oscillator circuit, D/A converter, and/or A/D converter, whether each be digital or analog.

As described above, since the electronic apparatus 201 uses the same power supply system as the system 101 of the third embodiment, directions and magnitudes of power supply output currents can be detected similarly to the third embodiment. Additionally, even when a load changes in state or when multiple power supplies are run in parallel, it is possible to implement stable operation free of vibration and divergence.

If the power supply system 101 becomes unstable, malfunction in the electronic circuit 206 may result from changes in output voltage. For electronic apparatus 201, since the power supply system 101 is stable, however, the electronic circuit 206 is substantially unlikely to malfunction. Hence, applying a technique based on the present invention yields the advantageous effects of stable electronic apparatus operation and high reliability.

A power supply control circuit of a fifth embodiment can be realized using the switching circuit 7 of FIG. 1 and the control circuit 22. Since the switching circuit 7 is controlled in desired timing by the control circuit 22, this power supply control circuit is embodied in the form of a semiconductor integrated circuit, a hybrid IC, a module, or the like, as a component of a power supply apparatus or unit.

The present invention relating to a current detection circuit, a power supply apparatus using the current detection circuit, a power supply system using the current detection circuit, and an electronic apparatus using the current detection circuit, can provide a power supply apparatus, power supply system, and electronic apparatus that each have a current detection circuit capable of detecting plus/minus directions and current quantities of output currents in power supplies correctly. Also, the power supply apparatus, the power supply system, and the electronic apparatus can implement stable operation free of vibration or divergence.

What is claimed is:

1. A current detection circuit for detecting an electric current of a switching power supply circuit in which an output of an inverter circuit is connected to a rectifier circuit via a transformer and an output of the rectifier circuit is connected to a smoothing circuit, the current detection circuit comprising:
a switching circuit including a plurality of switching elements, wherein the switching circuit receives a current waveform or voltage waveform analogous to a waveform of a primary-side current of the transformer, and operates synchronously with the inverter circuit.

2. The current detection circuit according to claim 1, wherein each of the switching elements is an FET.

3. The current detection circuit according to claim 1, wherein the rectifier circuit is of a synchronous rectifying type.

4. A semiconductor integrated circuit containing the current detection circuit according to claim 1.

5. A power supply apparatus comprising the current detection circuit according to claim 1.

6. A power supply system containing the power supply apparatus according to claim 5.

7. An electronic apparatus containing the power supply apparatus according to claim 5.

8. An electronic apparatus comprising the power supply system according to claim 6.

9. A parallel power supply system comprising at least two switching power supply units, wherein each of the switching power supply units includes:
a switching power supply circuit in which an output of an inverter circuit is connected to a rectifier circuit via a transformer, the rectifier circuit having an output connected to a smoothing circuit; and
a current detection circuit including plural switching elements each operating synchronously with the inverter circuit, the current detection circuit generating a current detection voltage by receiving an input signal having a current waveform or voltage waveform analogous to a waveform of a primary-side current of the transformer.

10. The parallel power supply system according to claim 9, wherein each of the switching power supply units includes a parallel operation circuit that conducts parallel-operation control by receiving an input of the current detection voltage that the current detection circuit has generated.

11. The parallel power supply system according to claim 9, wherein each of the switching power supply units includes an overcurrent protection circuit that conducts overcurrent control by receiving an input of the current detection voltage that the current detection circuit has generated.

12. An electronic apparatus using the parallel power supply system according to claim 9, the apparatus comprising an electronic circuit that operates on the electric power supplied from the parallel power supply system.

* * * * *